(12) United States Patent
Schat

(10) Patent No.: US 11,146,433 B2
(45) Date of Patent: Oct. 12, 2021

(54) HIGH DATA RATE TRANSMISSION USING MINIMUM ENERGY CODING WITH ULTRA WIDE BAND MODULATION

(71) Applicant: NXP B.V., Eindhoven (NL)

(72) Inventor: Jan-Peter Schat, Hamburg (DE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/815,258

(22) Filed: Mar. 11, 2020

(65) Prior Publication Data
US 2021/0288849 A1   Sep. 16, 2021

(51) Int. Cl.
*H04L 27/04* (2006.01)
*H04B 1/69* (2011.01)
*H04B 7/0456* (2017.01)

(52) U.S. Cl.
CPC .............. *H04L 27/04* (2013.01); *H04B 1/69* (2013.01); *H04B 7/0473* (2013.01); *H04B 2001/6912* (2013.01)

(58) Field of Classification Search
CPC .......... H04L 27/04; H04B 1/69; H04B 7/0473
See application file for complete search history.

(56) References Cited

U.S. PATENT DOCUMENTS

| | | | |
|---|---|---|---|
| 8,483,311 | B2 | 7/2013 | Varteva |
| 8,902,088 | B2 | 12/2014 | Bae et al. |
| 2016/0299869 | A1 | 10/2016 | Greenspan |

OTHER PUBLICATIONS

Ohlsson, Wernerson, A 15-GB/s Wireless On-Off keying link.*
Chen et al., "Study on the Multipath Propagation Characteristics of UWB Signal for Indoor Lab Environments," IEEE International Conference on Ubiquitous Wireless Broadband, 2016, pp. 1-4; 4 pages.
Decawave, "UWB Regulations, A Summary of Worldwide Telecommunications Regulations governing the use of Ultra-Wideband radio," Application Note: APR001, Version 1.2, 63 pages.
Elganimi, "Performance Comparison between OOK, PPM and PAM Modulation Schemes for Free Space Optical (FSO) Communication Systems: Analytical Study," International Journal of Computer Applications (0975-8887), vol. 79, No. 11, Oct. 2013, pp. 22-27; 6 pages.
Erin et al., "Energy Optimal Codes for Wireless Communications," 38th IEEE Conference on Decision and Control, 1999 vol. 5, pp. 4446-4453; 8 pages.
Erin et al., "Minimum Energy Coding for RF Transmission," 1999 IEEE Wireless Communications and Networking Conference, vol. 2, pp. 621-625; 5 pages.

(Continued)

*Primary Examiner* — Ronald B Abelson

(57) ABSTRACT

A method for high data rate transmission using minimum energy coding with Ultra Wide Band modulation includes encoding each of a plurality of sourcewords into a respective codeword. Each respective codeword includes a single logic-high bit. A codeword duty cycle is less than a low duty cycle threshold, wherein the codeword duty cycle is based on a bit length of the codeword. Each respective codeword is modulated with an On-Off-Keying (OOK) modulation to form a respective modulated codeword, wherein a transmission of each modulated codeword occurs only for the single logic-high bit in each respective codeword.

20 Claims, 9 Drawing Sheets

(56) References Cited

OTHER PUBLICATIONS

European Telecommunications Standards Institute, "Electromigration compatibility and Radio spectrum Matters (ERM); Short Range Devices (SRD) using Ultra Wide Band (UWB); Transmission characteristics, Part 2: UWB mitigation techniques," ETSI TR 103 181-2, v1.1.1 (Jun. 2014); 79 pages.

European Telecommunications Standards Institute, "Short Range Devices (SRD) using Ultra Wide Band technology (UWB); Harmonised Standard covering the essential requirements of article 3.2 of the Directive 2014/53/EU; Part 1: Requirements for Generic UWB applications," ETSI EN 302 065-1 V2.1.1 (Nov. 2016); 32 pages.

Fischione et al., "Minimum Energy Coding in CDMA Wireless Sensor Networks," IEEE Transactions on Wireless Communications, vol. 8 No. 2, Feb. 2009; 10 pages.

Hongmei et al., "UWB Multipath Propagation Channel Characteristics Based on Time-Domain Ray Tracing," 2016 2nd IEEE International Conference on Computer and Communications, pp. 1656-1661; 6 pages.

Kocaoglu et al., "Minimum Energy Coding for Wireless NanoSensor Networks," 31st Annual IEEE International Conference on Computer Communications 2013, pp. 998-1002; 5 pages.

Kocaoglu et al., "On the Node Density Limits and Rate-Delay-Energy Tradeoffs in Ad Hoc Nanonetworks with Minimum Energy Coding," IEEE International Conference on Communications, 2012, pp. 6157-6161; 5 pages.

Maxim, "+3.3V, 2.488Gbps, SDH/SONET 1:16 Deserializer with Clock Recovery," MAXIM3881 data sheet,19-1196, Rev 1, 2001; 11 pages.

Peng et al., "Realistic Energy Consumption Model for On-Off Keying Based Minimum Energy Coding," IEEE 79th Vehicular Technology Conference, 2014, pp. 1-5; 5 pages.

Prakash et al., "Energy Efficient Source Coding and Modulation for Wireless Applications," 2003 IEEE Wireless Communications and Networking, 2003, vol. 1, pp. 212-217; 6 pages.

Sharma et al., "Performance of Pulse Position Modulation Using Various UWB Pulses," 2015 IEEE International Advance Computing Conference (IACC), pp. 650-654; 5 pages.

Tang et al., "BER Performance Analysis of an On-off Keying based Minimum Energy Coding for Energy Constrained Wireless Sensor Applications," IEEE International Conference on Communications, 2005, vol. 4, pp. 2734-2738; 5 pages.

Yao et al., "Pulse Position Coding for Information Capacity Promotion in Electromagnetic Nanonetworks", Tangible, Embedded, and Embodied, Sep. 21, 2015, pp. 1-6.

Lo et al., "OOK/BPSK-Modulated Impulse Transmitters Integrated With Leakage-Cancelling Circuit", IEEE Transactions on Microwave Theory and Techniques, Jan. 1, 2013, pp. 218-224, vol. 61, No. 1.

\* cited by examiner

| Sourceword | Codeword |
|---|---|
| 000 | 00000001 |
| 001 | 00000010 |
| 010 | 00000100 |
| 011 | 00001000 |
| 100 | 00010000 |
| 101 | 00100000 |
| 110 | 01000000 |
| 111 | 10000000 |

HIGH DATA RATE TRANSMISSION USING MINIMUM ENERGY CODING WITH ULTRA WIDE BAND MODULATION

FIELD

This disclosure relates generally to data transmission, and more specifically to improving the transmission and reception of Ultra Wide Band (UWB) modulated data with a combination of sourceword coding and additional modulation protocols.

BACKGROUND

UWB is a data transmission standard that can be used without a license. UWB provides for a very wide bandwidth, allowing for a data rate of several GBits/s with very high immunity to perturbations. However, one shortcoming with UWB is the limited permitted transmitter output power, that allows only a range of a few meters. Another problem with UWB is inter-symbol interference due to multipath propagation.

Many applications will benefit from an improved transmission range, transmission data rate, low transmission energy and/or low inter-symbol interference. For example, Internet of Things (IoT) devices often require a greater range than just a few meters, while operating with a limited energy supply. Bio-sensors often have a strict power limit to avoid over-heating of the body tissue. Furthermore, many devices have strict requirements to reduce the risk of electromagnetic interference.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Various embodiments described herein provide for improving UWB communication with a combination of sourceword coding and OOK modulation. By encoding sourcewords into codewords that have few logic-high bits, (in one example embodiment, one logic-high bit), a duty cycle of the codeword is reduced below a regulatory threshold that permits the use of higher peak transmission power. Specifically, UWB regulations define a Low Duty Cycle (LDC) mitigation technique that defines a duty cycle threshold, below which, a higher maximum peak power is permitted. In one example embodiment, operating with a codeword duty cycle of less than 0.5% permits an increase in peak transmission power of approximately 10 to 20 dB. By enabling higher peak power operation, the need for forward or backward error correction is also eliminated in various embodiments, thus further saving system operating power. Furthermore, operating with fewer logic-high bits per codeword (e.g., in one example embodiment, there is one logic-high bit per codeword), inter-symbol interference is significantly reduced. In one embodiment, surrounding a singular logic-high bit per codeword by many logic-low bits, significantly reduces inter-symbol interference, which improves the signal quality at the receiver.

Thus, encoding sourcewords with few logic-high bits combined with OOK modulation reduces the transmitted symbol duty cycle, thereby enabling LDC mitigation, reduces the inter-symbol interference and permits higher transmission power per bit. The result is an improved net SNR with improved range, improved data rate and reduced inter-symbol interference, amongst other benefits. Furthermore, UWB transmission is allowed and covered by respective regulations in most countries. The frequency band is for example in the 3 GHz to 10 GHz range, which is convenient for many commercial high-data rate applications because standard CMOS processes are usable, with good signal transfer characteristics and small antennas.

Figure 1:
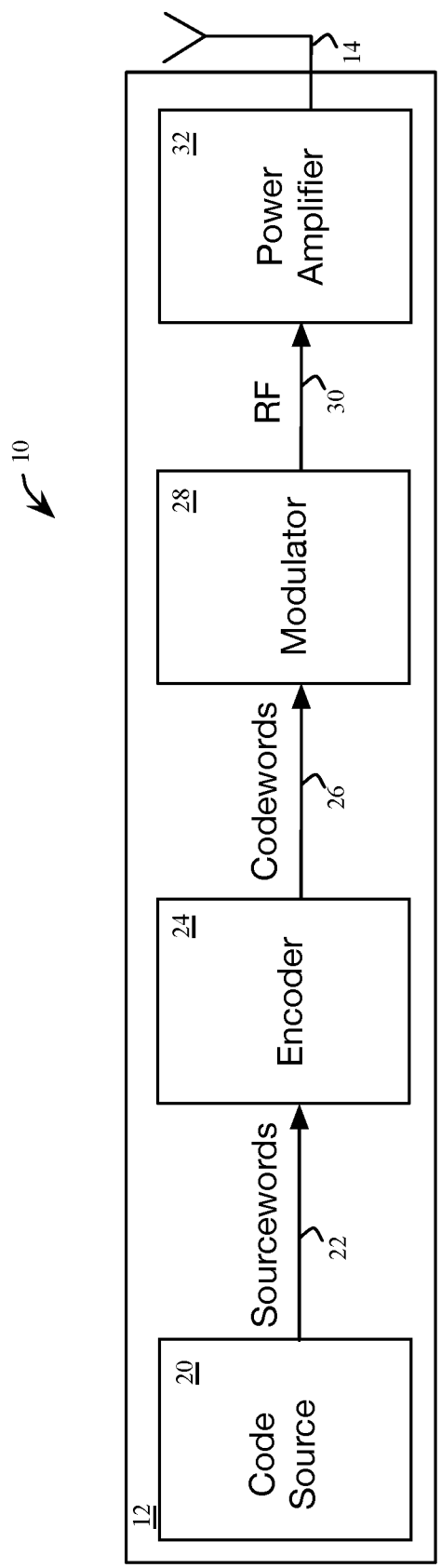
FIG. 1 is a schematic view of an example embodiment of a transmitter using Minimum Energy (ME) Coding.

FIG. 1 shows an example embodiment 10 using Minimum Energy (ME) encoding, including a transmitter circuit 12 coupled to an antenna 14. A code source 20 provides sourcewords 22. The sourcewords 22 are encoded, with an encoder circuit 24, into longer codewords 26. The codewords 26 have in general (or on average) fewer logic-high bits than the respective sourceword 22. In one example embodiment, each encoded codeword has exactly one logic-high bit. Each codeword 26 is modulated with a modulator circuit 28 using OOK modulation to produce an RF output 30. In one example embodiment, the RF output 30 is amplified with a power amplifier 32 and radiated with the antenna 14.

Figures 2, 3:
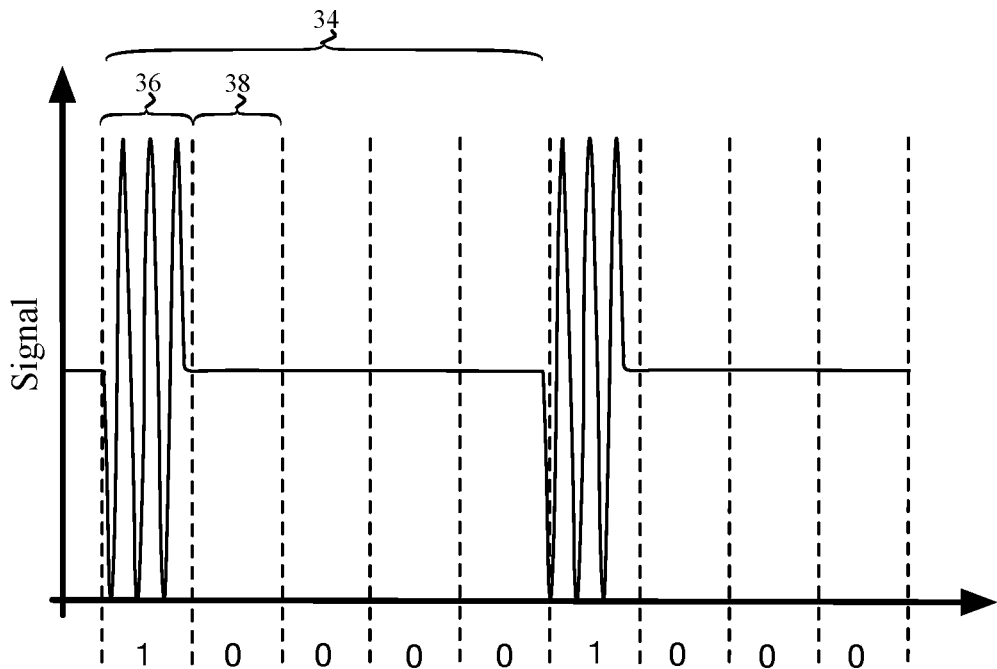
FIG. 2 is a graphical view of an embodiment of Radio Frequency (RF) transmission using On-Off-Keying (OOK) of logic-low bits and logic-high bits.
FIG. 3 is a tabular view of an embodiment of a coding map to encode a sourceword into a respective codeword.

FIG. 2 shows the RF output 30 for two consecutive codewords modulated with OOK modulation by the modulator circuit 28. Specifically, in a first codeword 34 comprised of a logic-high bit 36 followed by a series of logic-low bits 38, only the logic-high bit 36 is modulated with a sine wave of constant frequency while using OOK modulation. FIG. 3 shows a code mapping used by the encoder circuit 24 to map sourcewords 22 of 3 bits in length into codewords 26 of 8 bits in length to ensure only a single logic-high bit occurs in each codeword 26. In one example embodiment, the length of the codeword is the length of the corresponding sourceword raised to the power of two.

In one example embodiment, the modulator 28 uses Chirp modulation in addition to OOK modulation, hence using a very wide frequency band for increased data rate, noise immunity and reduced Bit Error Rate (BER). In each of the example embodiments, the ME encoding scheme results in a low percentage of active transmission time (e.g., a low codeword duty cycle), hence the preconditions for the privilege of the LDC mitigation apply as specified in regulatory standards for UWB communication. Accordingly, an SNR level is achievable for a range of 10 meters to 100 meters, with a higher data rate than without the teachings described herein.

The encoding shown in FIG. 3 specifically excludes an all-zero codeword (e.g., "00000000"), to enable synchronization of a receiver configured to receive all possible combinations of the codewords 26 transmitted by the example embodiment 10. In an example embodiment, each codeword includes only a single logic-high bit 36, thus there is always exactly one logic-high bit 36 per codeword to ensure that the receiver remains synchronized. It should be understood that in other embodiments, a similar advantage is achieved by transmitting only a single logic-low bit amongst a plurality of logic-high bits, where only the single logic-low bit is modulated with OOK modulations and appropriate logical inversions are included.

Figure 4:
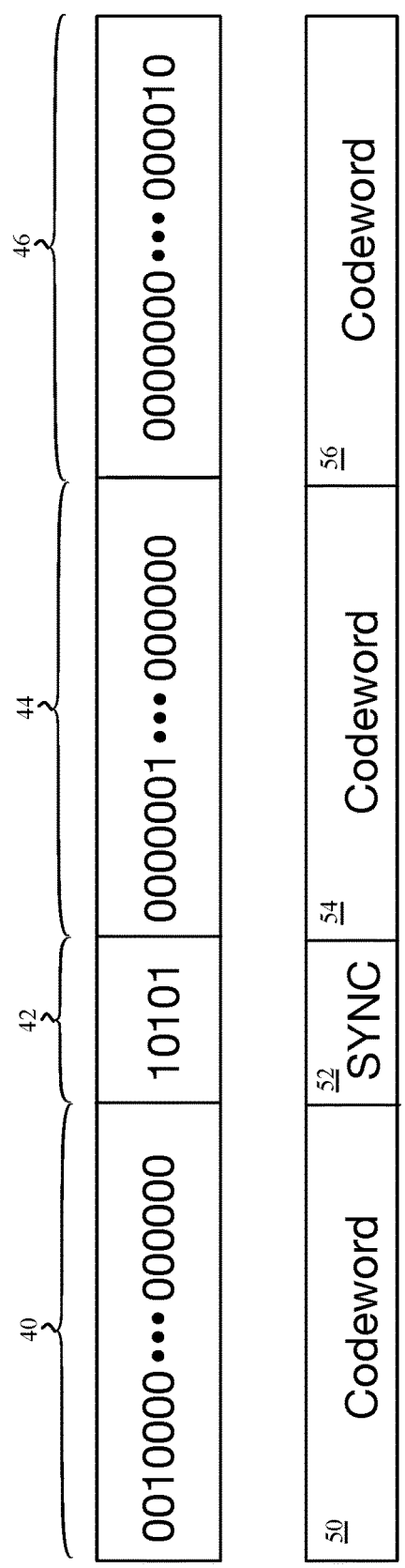
FIG. 4 is a graphical view of an example embodiment of a data stream showing synchronizing control word preceding one or more codewords.

With reference to FIG. 4, a data stream of an example embodiment is shown with a synchronizing control word transmitted before the transmission of one or more codewords 26. While the codewords carry payload information, the control words are beneficial to synchronize the receiver at the start of the next codeword transmission. As shown in FIG. 4, a series of codewords 40, 44 and 46 are shown as bit streams, wherein each codeword includes a single logic-high bit 36. Prior to transmitting the series of codewords 44 and 46, a synchronizing control word 42 is transmitted. The sequence of codewords are also shown symbolically as codewords 50, 54 and 56 with the intervening synchronizing control word ("SYNC") 52. The control word 52 (or 42) is chosen so that the receiver can distinguish the control word 52 from any possible sequence of codewords 50, 54 and 56. This distinction is achieved in one embodiment by defining the control word 52 as a bit sequence of alternating logic-high bits ("1") and logic-low bits ("0") shown at the bit stream level as the control word 42. Moreover, the exact position of the "10101" sequence of the control word 42 is also determinable by the receiver, irrespective of whether the preceding codeword 50 ends with a logic-low bit or a logic-high bit, and irrespective of whether the following codeword 54 starts with a logic-low bit or a logic-high bit.

The codeword length (e.g., "bit length"), is bound by an upper limit and a lower limit. The upper limit of the codeword length is limited by the receiver's ability to synchronize to a data stream having many consecutive logic-low bits. In one embodiment, a high-speed receiver can maintain clock synchronization with approximately 2000 consecutive logic-low bits (e.g., with synchronization occurring on logic-high bits). Thus, a codeword with a length of 512 bits beginning with a logic-high bit, followed by a codeword of 512 bits ending with a logic-high bit has 1022 consecutive logic-low bits and will be adequately synchronized by the receiver. A lower limit of the codeword length is determined by a codeword duty cycle being less than an LDC threshold defined by UWB regulations (e.g., less than 0.5%). Thus, the codeword needs to be at least 256 bits in length. In one embodiment, having byte-wise partitioning of the code source 20, and constrained by the upper limit and low limit, a codeword length of 256 bits is used.

Figure 5:
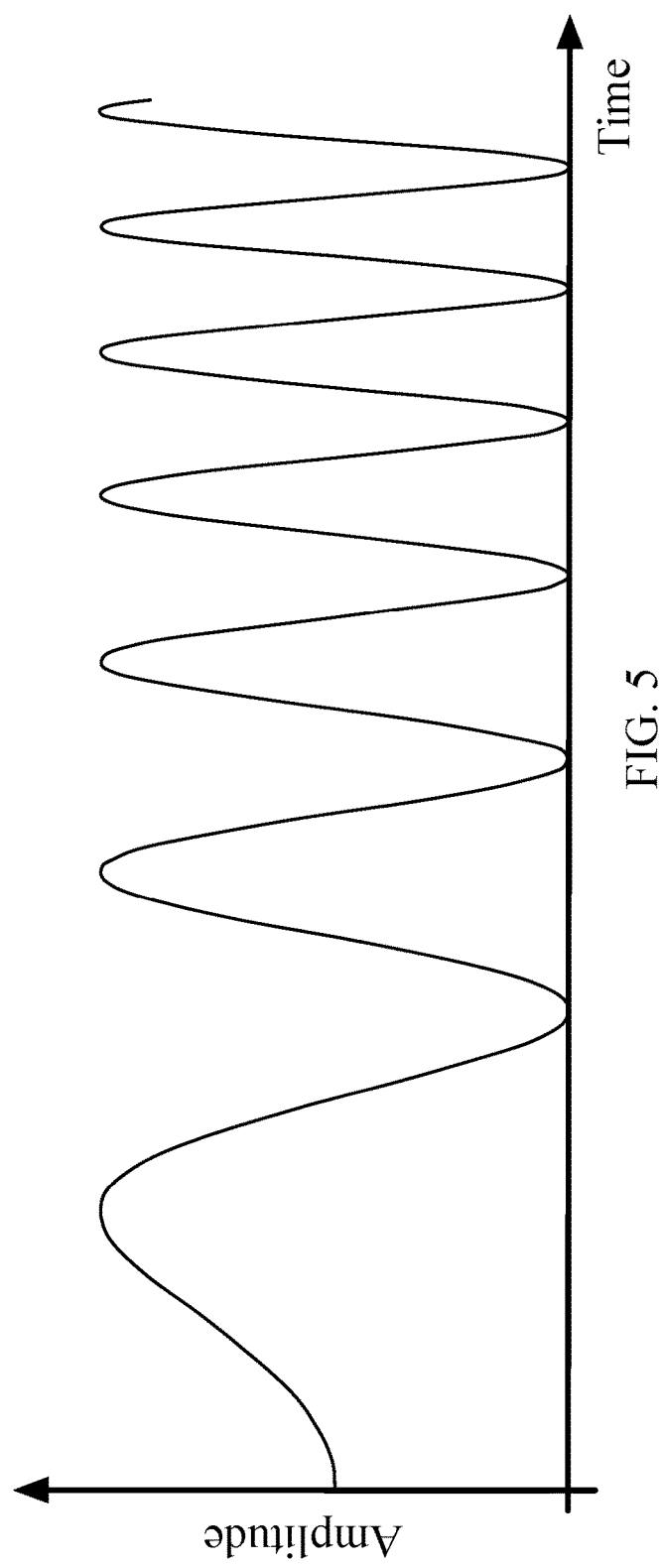
FIG. 5 is a graphical view of an embodiment of a Chirp modulation with linearly increasing frequency.

Referring to FIG. 5, in one example embodiment a Chirp modulation is added to the OOK modulation performed by the modulator circuit 28 of FIG. 1. FIG. 5 shows an up-Chirp modulation, however in another example embodiment a down-Chirp modulation is used. The Chirp modulation uses a short signal with a constant amplitude and a linearly increasing (or decreasing) frequency.

Figure 6:
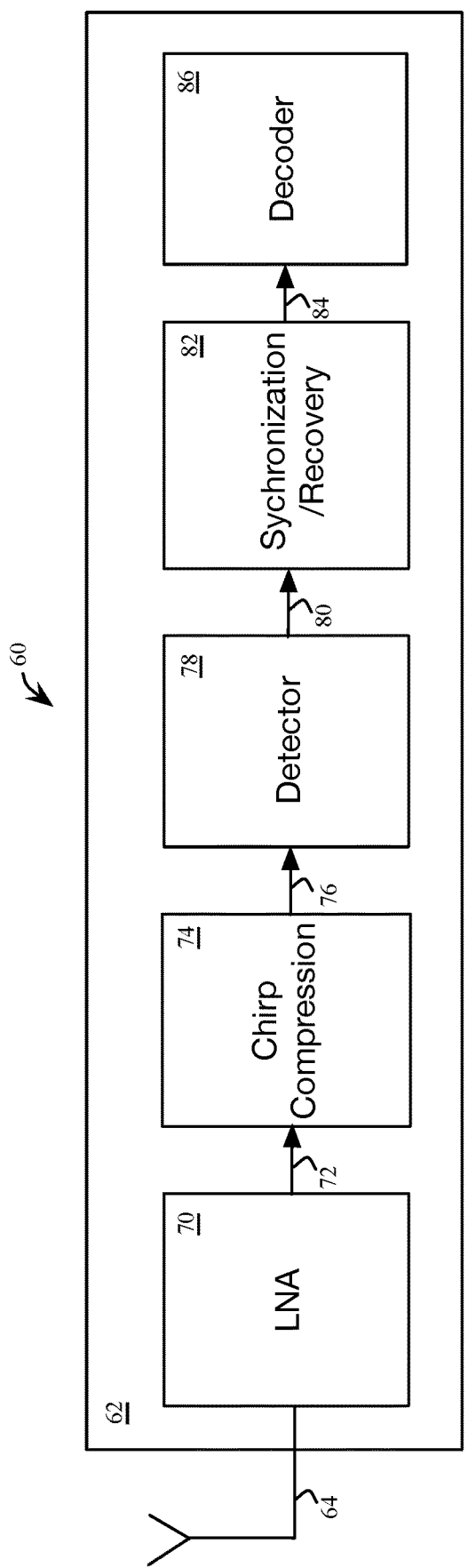
FIG. 6 is a schematic view of an example embodiment of a receiver using Minimum Energy (ME) Coding.

FIG. 6 shows an example embodiment 60 using Minimum Energy (ME) encoding, including a receiver circuit 62 coupled to an antenna 64. A Low Noise Amplifier 70 amplifies a signal from the antenna 64 to provide an amplified signal 72. A Chirp compression circuit 74 compresses the amplified signal 72 to provide a compressed signal 76. A detector circuit 78 detects the logic-high bit of the codeword with an analog to digital conversion to produce a detected signal 80. A synchronization recovery circuit 82 synchronizes a clock of the receiver circuit 62 based on the received codewords and control words to produce a synchronized signal 84. A decoder circuit 86 extracts and converts the received codewords and produces corresponding sourcewords based on the encoding mapping used by the encoder circuit 24 of FIG. 1.

Figure 7:
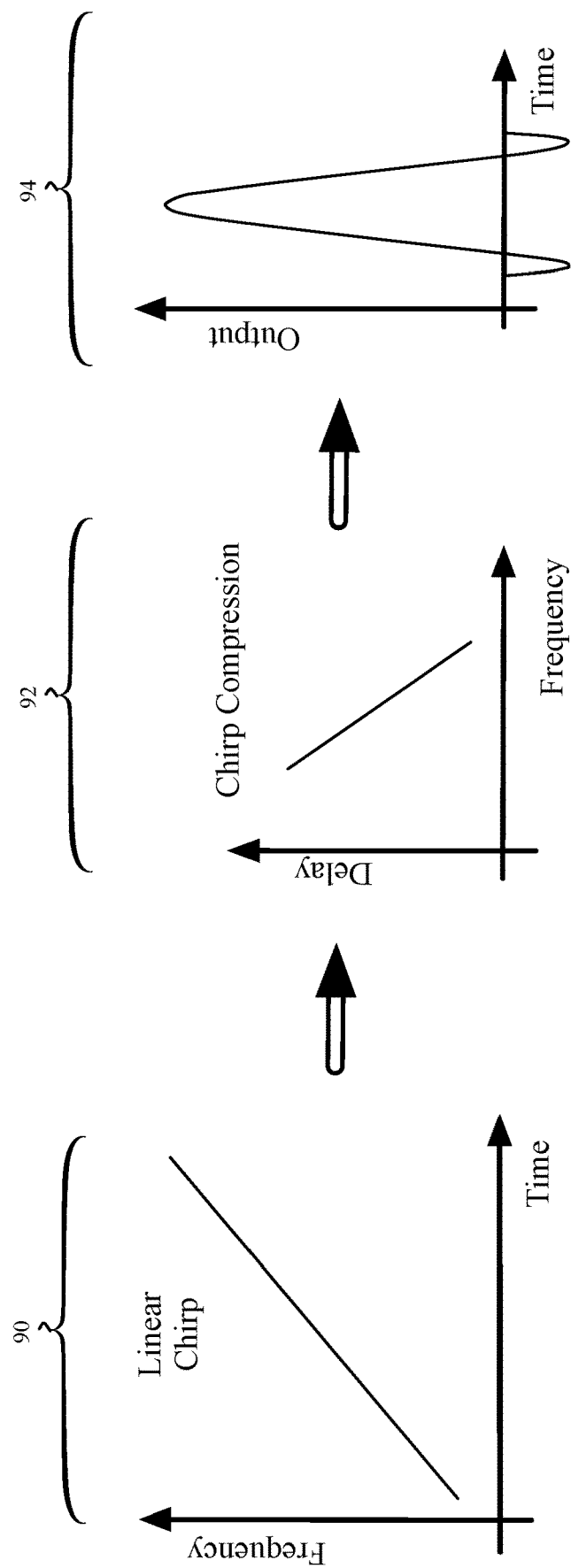
FIG. 7 is a graphical view of an example embodiment of Chirp compression in the receiver of FIG. 6.

With reference to FIG. 7 and continued reference to FIG. 6, the Chirp compression circuit 74 feeds the amplified signal 72, (see transfer function 90), through a delay unit with a frequency-dependent propagation delay, (see transfer function 92), so that the lower frequencies at the start of the Chirp, (see FIG. 5), are delayed more than the higher frequencies at the end of the Chirp. The compressed Chirp is very short, and thus has nearly all of its energy concentrated in a small time interval, (see output voltage 94 corresponding to the compressed signal 76). Accordingly, the compressed signal 76 has a high amplitude during this small time interval, allowing for good discrimination against the noise floor. In addition to improving the net SNR, the Chirp compression improves immunity against perturbations of transmitters operating in a narrow frequency band. The receiver circuit 62 needs to perform clock recovery from the data stream received by the antenna 64. The timing of the received Chirps, (each indicating a singular logic-high bit within a codeword), is important. The time of arrival of the Chirp can be determined very precisely by the receiver circuit 62, given the short duration of the compressed pulse as shown by the output voltage 94.

Figure 8:
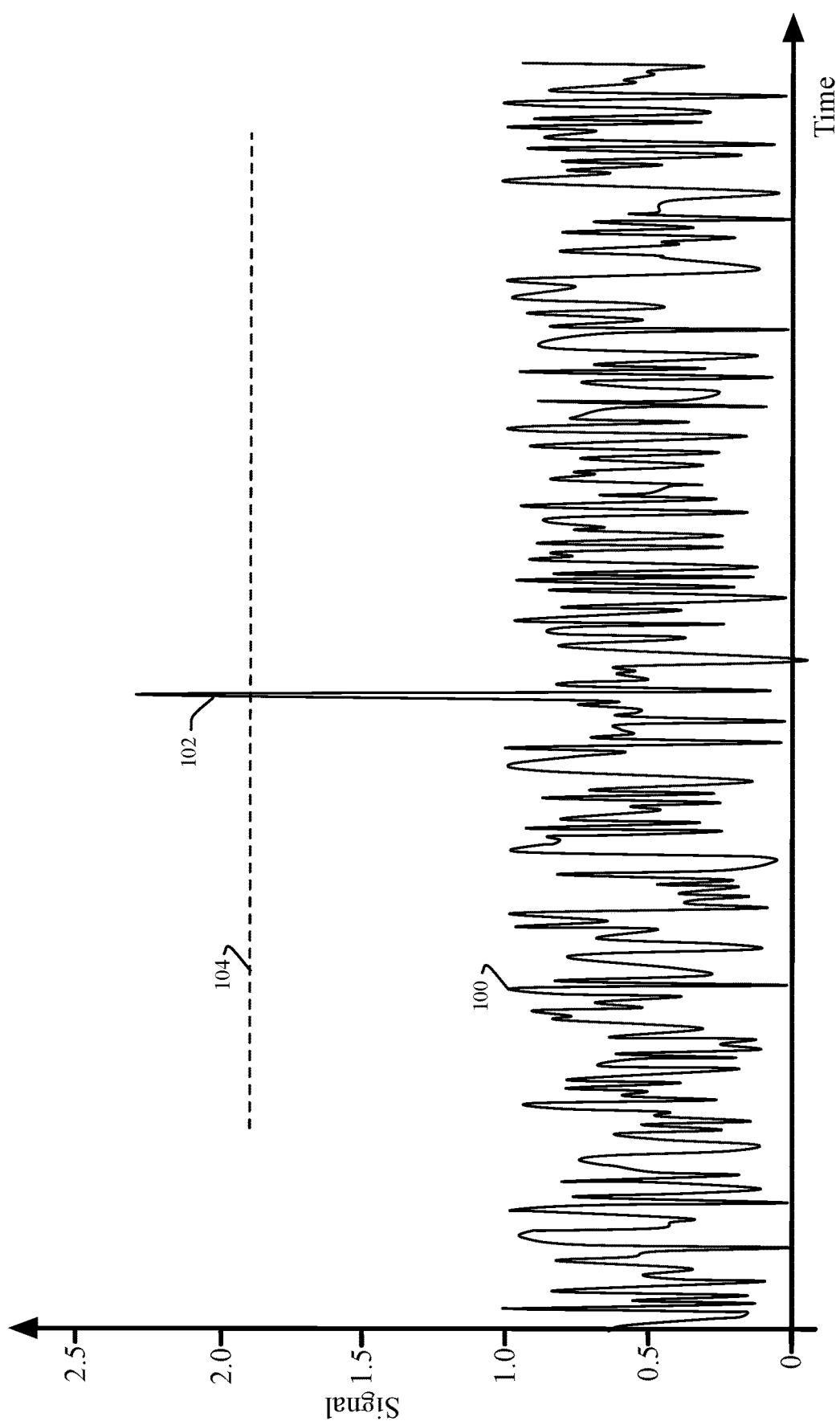
FIG. 8 is a graphical view of an example embodiment of a signal and decision threshold used by the detector of the receiver of FIG. 6.

With reference to FIG. 8 and continued reference to FIG. 6, the detector circuit 78 determines if the compressed signal 76 is a logical logic-high or logic-low bit by performing an analog to digital conversion using "soft decision" detection with a variable threshold. In one example embodiment, the compressed signal 76 of FIG. 6 includes logic-low bit signals 100 amongst a single logic-high bit signal 102. The variable threshold 104 is varied so that for each received codeword, (or control word), the bit with the highest signal amplitude is considered to be the logic-high bit. Soft decision detection has a lower BER than "hard-decision" detection, which uses a fixed threshold to determine whether a bit is a logic-low bit or a logic-high bit. Specifically, the variable threshold 104 for low duty cycle codewords will be nearer to the peak of the logic-high bit, rather than set to 50% of the logic-high bit maximum. Accordingly, the BER of the logic-low bits in each codeword is reduced relative to the BER of the logic-high bit, hence minimizing the total codeword BER.

The synchronization recovery circuit 82 detects the control word 52 of FIG. 5 and samples each bit of each codeword out of the data stream received by the receiver circuit 62. The synchronization circuit 82 only synchronizes on logic-high bits, hence the upper limit of the codeword length of each codeword defines the limits of the clock recovery circuit in the synchronization circuit 82. In one embodiment, a low cost recovery circuit is able to recover and maintain clock synchronization with a codeword length of 256 bits, where each codeword includes a single logic-high bit. The decoder 86 decodes the codewords received by the receiver circuit 62 back to sourcewords, using the mapping defined by the encoder circuit 24. In one embodiment, the decoder circuit 86 uses a look-up table to perform the codework to sourceword mapping. In another embodiment, the decoder circuit 86 uses decoding logic to perform the codework to sourceword mapping.

Figure 9:
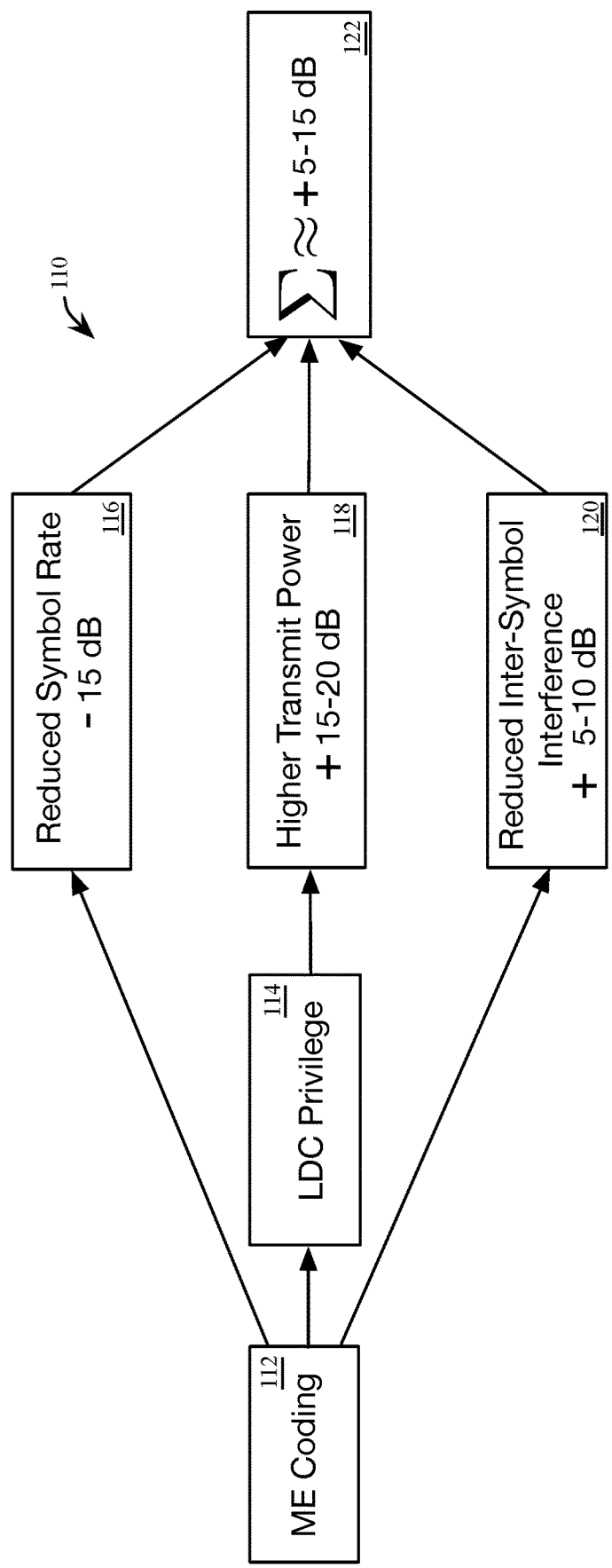
FIG. 9 is a schematic view showing the contributions of ME coding for improving the Signal to Noise Ratio (SNR) in accordance with an example embodiment of the present disclosure.

FIG. 9 shows the contributions of ME coding 112 as an equivalent improvement of SNR in accordance with an example embodiment 110 of the present disclosure. The embodiment 110 pertains to existing UWB standards and governmental regulations, however it should be understood that similar benefits are achievable with similar standards and governmental regulations relying upon LDC mitigation. The SNR of a transmitted ME coded sourceword (e.g., with the aforementioned sourceword to codeword mapping and OOK modulation), are affected by several factors, whose combined equivalent SNR contributions result in an improved net SNR. Firstly, by reducing the codeword duty cycle of the ME coding 112, through sourceword to codeword mapping, the LDC privilege 114 is enabled. In the example embodiment 110, the reduced duty cycle of the ME coding 112 reduces the symbol rate 116 by approximately 15 dB. Specifically, by encoding 8 sourceword bits into 256 codeword bits, there is a loss of information-carrying symbols by a factor of 256/8 or 32, which is equivalent to a loss in transmit power −15.1 dB (e.g., $10 \log_{10}(1/32)$).

The reduction in duty cycle also enables the LDC privilege 114, which permits higher peak transmit power 118, thus increasing the effective SNR by approximately 15 dB to 20 dB. Furthermore, the sourceword to codeword mapping reduces the inter-symbol interference 120, thus further increasing the effective SNR by approximately 5 dB to 10 dB. The inter-symbol interference 120 is reduced due to a reduction in multipath interference between neighboring symbols, because the neighboring symbols of the logic-high bit are logic-low bits in nearly all cases. The specific gain resulting from the reduction in inter-symbol interference 120 dependents in part on the geometry of the room, (or transmission environment), the bandwidth and other factors. Accordingly, for the example embodiment 110, the net SNR 122 is increased by approximately 5 dB to 15 dB.

Figure 10:
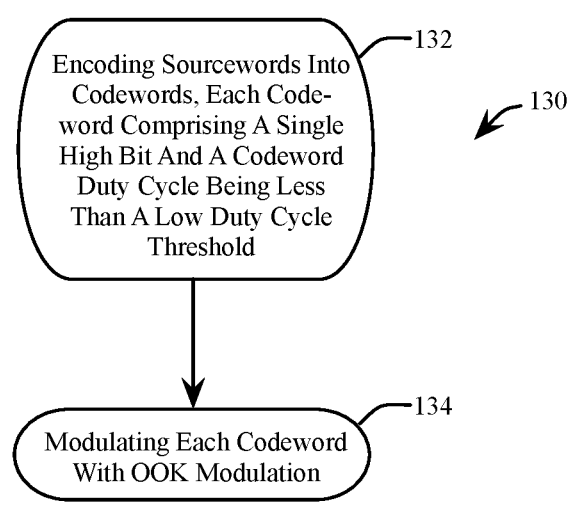
FIG. 10 is a flowchart representation of a method for high data rate transmission using minimum energy coding with UWB modulation in accordance with an example embodiment of the present disclosure.

FIG. 10 shows an example embodiment 130 of a method for high data rate transmission using ME coding with UWB modulation. With reference to FIG. 10 and FIG. 1, at 132 sourcewords 22 are encoded into codewords 26. Each codeword comprises a single logic-high bit and a codeword duty cycle being less than a low duty cycle threshold. At 134, each codeword 26 is modulated with OOK modulation.

Figure 11:
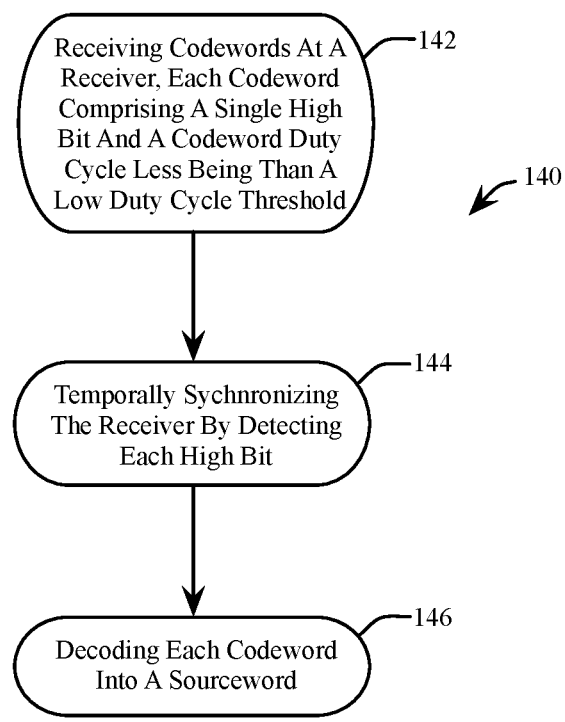
FIG. 11 is a flowchart representation of a method for high data rate transmission using minimum energy coding with UWB modulation in accordance with an example embodiment of the present disclosure.

FIG. 11 shows an example embodiment 140 of a method for high data rate transmission using ME coding with UWB modulation. With reference to FIG. 11 and FIG. 6, at 142 codewords are received at a receiver circuit 62. Each codeword comprises a single logic-high bit and a codeword duty cycle being less than a low duty cycle threshold. At 144, the receiver circuit 62 is temporally synchronized by detecting each logic-high bit (e.g., with the synchronization circuit 82). At 146, each codeword is decoded into a respective sourceword (e.g., with the decoder circuit 86).

As will be appreciated, embodiments as disclosed include at least the following. In one embodiment, a method for high data rate transmission using minimum energy coding with Ultra Wide Band modulation comprises encoding each of a plurality of sourcewords into a respective codeword. Each respective codeword comprises a single logic-high bit, and a codeword duty cycle being less than a low duty cycle threshold, wherein the codeword duty cycle is based on a bit length of the codeword. Each respective codeword is modulated with an On-Off-Keying (OOK) modulation to form a respective modulated codeword, wherein a transmission of each modulated codeword occurs only for the single logic-high bit in each respective codeword.

Alternative embodiments of the method for high data rate transmission using minimum energy coding with Ultra Wide Band modulation include one of the following features, or any combination thereof. The low duty cycle threshold defines a regulatory limit, below which, a higher peak transmission power is permitted. The low duty cycle threshold is 0.5 percent. Each modulated codeword is further modulated with a Chirp modulation. An upper limit of the bit length is determined by a synchronization circuit of a receiver configured to receive the transmission. A lower limit of the bit length is determined by the codeword duty cycle being less than the low duty cycle threshold. The bit length is 256 bits. A control word is transmitted before transmitting one or more of the codewords, the control word comprising a sequence of alternating logic-high bits and logic-low bits. The bit length of the codeword is greater than a control word length of the control word.

In another embodiment, an apparatus comprises an encoder circuit configured to encode a plurality of sourcewords into a respective codeword. Each respective codeword comprises a single logic-high bit, and a codeword duty cycle being less than a low duty cycle threshold, wherein the codeword duty cycle is based on a bit length of the codeword. A modulator circuit is configured to modulate each respective codeword with an On-Off-Keying (OOK) modulation to form a respective modulated codeword. A transmitter circuit is configured to transmit each modulated codeword only during the single logic-high bit in each respective codeword.

Alternative embodiments of the apparatus include one of the following features, or any combination thereof. The low duty cycle threshold defines a regulatory limit, below which, a higher peak transmission power is permitted. An upper limit of the bit length is determined by a synchronization circuit of a receiver configured to receive the transmission. A lower limit of the bit length is determined by the codeword duty cycle being less than the low duty cycle threshold. The transmitter circuit is configured to transmit a control word before transmitting one or more of the codewords, the control word comprising a sequence of alternating logic-high bits and logic-low bits.

In another embodiment, a method for high data rate transmission using minimum energy coding with Ultra Wide Band modulation comprises receiving a plurality of codewords at a receiver. Each respective codeword comprises a single logic-high bit, and a codeword duty cycle being less than a low duty cycle threshold, wherein the codeword duty cycle is based on a bit length of the codeword. The receiver is temporally synchronized by detecting each single logic-high bit in the respective codeword. Each codeword is decoded into a respective sourceword.

Alternative embodiments of the method for high data rate transmission using minimum energy coding with Ultra Wide Band modulation include one of the following features, or any combination thereof. The low duty cycle threshold defines a regulatory limit, below which, a higher peak transmission power is permitted. An upper limit of the bit length is determined by a synchronization circuit of a receiver configured to receive the transmission. A lower limit of the bit length is determined by the codeword duty cycle being less than the low duty cycle threshold. The respective logic-high bit of each codeword is detected with a variable threshold. The receiver is temporally synchronized by detecting a sequence of alternating logic-high bits and logic-low bits within a control word, the control word preceding at least one of the plurality of codewords.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for high data rate transmission using minimum energy coding with Ultra Wide Band modulation comprising:
   encoding each of a plurality of sourcewords into a respective codeword, each respective codeword comprising a single logic-high bit, and a codeword duty cycle being less than a low duty cycle threshold, wherein the codeword duty cycle is based on a bit length of the codeword; and
   modulating each respective codeword with an On-Off-Keying (OOK) modulation to form a respective modulated codeword, wherein a transmission of each modulated codeword occurs only for the single logic-high bit in each respective codeword.

2. The method of claim 1 wherein the low duty cycle threshold defines a regulatory limit, below which, a higher peak transmission power is permitted.

3. The method of claim 2 wherein the low duty cycle threshold is 0.5 percent.

4. The method of claim 1 wherein each modulated codeword is further modulated with a Chirp modulation.

5. The method of claim 1 wherein an upper limit of the bit length is determined by a synchronization circuit of a receiver configured to receive the transmission.

6. The method of claim 1 wherein a lower limit of the bit length is determined by the codeword duty cycle being less than the low duty cycle threshold.

7. The method of claim 1 wherein the bit length is 256 bits.

8. The method of claim 1 further comprising transmitting a control word before transmitting one or more of the codewords, the control word comprising a sequence of alternating logic-high bits and logic-low bits.

9. The method of claim 8 wherein the bit length of the codeword is greater than a control word length of the control word.

10. An apparatus comprising:
    an encoder circuit configured to encode a plurality of sourcewords into a respective codeword, each respective codeword comprising a single logic-high bit, and a codeword duty cycle being less than a low duty cycle threshold, wherein the codeword duty cycle is based on a bit length of the codeword;
    a modulator circuit configured to modulate each respective codeword with an On-Off-Keying (OOK) modulation to form a respective modulated codeword; and
    a transmitter circuit configured to transmit each modulated codeword only during the single logic-high bit in each respective codeword.

11. The apparatus of claim 10 wherein the low duty cycle threshold defines a regulatory limit, below which, a higher peak transmission power is permitted.

12. The apparatus of claim 10 wherein an upper limit of the bit length is determined by a synchronization circuit of a receiver configured to receive the transmission.

13. The apparatus of claim 10 wherein a lower limit of the bit length is determined by the codeword duty cycle being less than the low duty cycle threshold.

14. The apparatus of claim 10 wherein the transmitter circuit is configured to transmit a control word before transmitting one or more of the codewords, the control word comprising a sequence of alternating logic-high bits and logic-low bits.

15. A method for high data rate transmission using minimum energy coding with Ultra Wide Band modulation comprising:
    receiving a plurality of codewords at a receiver, each respective codeword comprising a single logic-high bit, and a codeword duty cycle being less than a low duty cycle threshold, wherein the codeword duty cycle is based on a bit length of the codeword;
    temporally synchronizing the receiver by detecting each single logic-high bit in the respective codeword; and
    decoding each codeword into a respective sourceword.

16. The method of claim 15 wherein the low duty cycle threshold defines a regulatory limit, below which, a higher peak transmission power is permitted.

17. The method of claim 15 wherein an upper limit of the bit length is determined by a synchronization circuit of a receiver configured to receive the transmission.

18. The method of claim 15 wherein a lower limit of the bit length is determined by the codeword duty cycle being less than the low duty cycle threshold.

19. The method of claim 15 further comprising detecting the respective logic-high bit of each codeword with a variable threshold.

20. The method of claim 15 further comprising temporally synchronizing the receiver by detecting a sequence of alternating logic-high bits and logic-low bits within a control word, the control word preceding at least one of the plurality of codewords.

* * * * *